Sept. 26, 1950     B. H. JENNINGS ET AL     2,523,372
APPARATUS FOR VAPORIZING LIQUID
Filed May 10, 1946
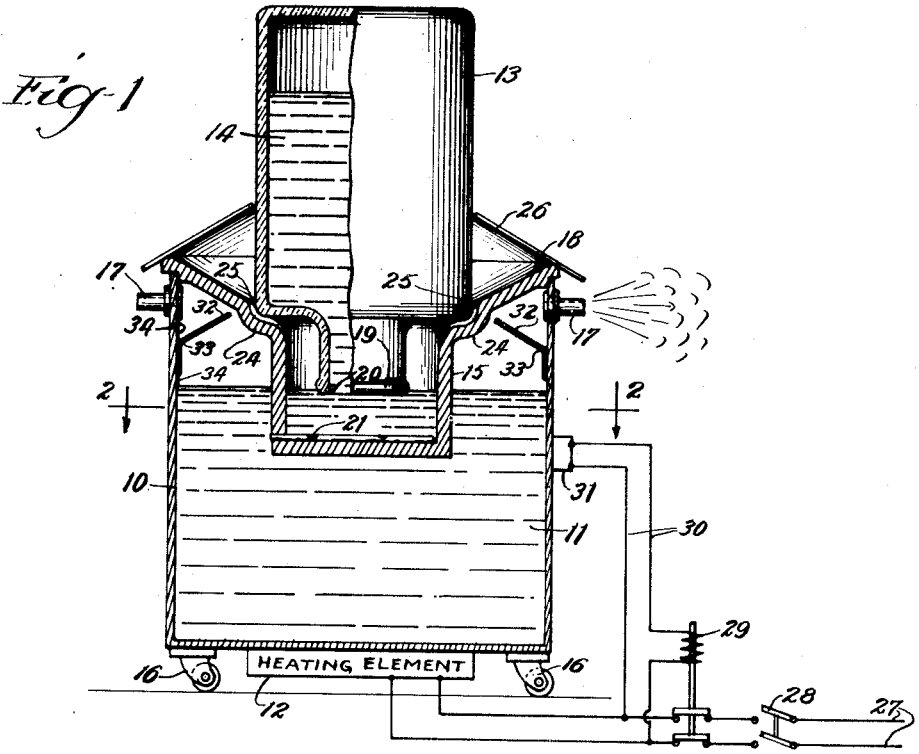
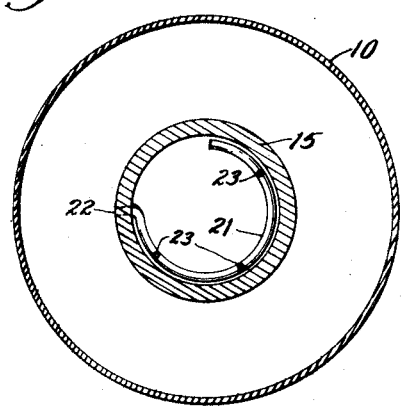
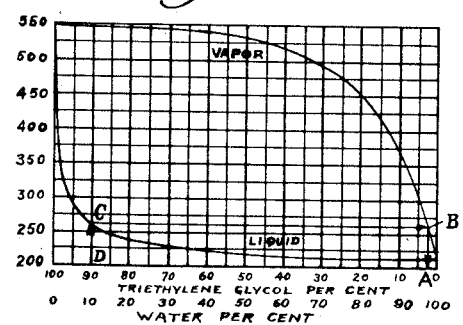
Inventors.
Burgess H. Jennings,
Franklin C. W. Olson &
Edward Bigg.
By: Mann and Brown
Attys.

Patented Sept. 26, 1950

2,523,372

UNITED STATES PATENT OFFICE 2,523,372

APPARATUS FOR VAPORIZING LIQUID

Burgess H. Jennings and Edward Bigg, Evanston, and Franklyn C. W. Olson, Wilmette, Ill., assignors, by mesne assignments, to Research Corporation, New York, N. Y., a corporation of New York Application May 10, 1946, Serial No. 668,947

4 Claims. (Cl. 21—74)

1

This invention relates to a method and apparatus for vaporizing liquid and more particularly to a method and apparatus for producing a substantially constant proportion of constituent vapor from a mixture of miscible liquids having different boiling points.

Controlled vapor output from a vaporizer becomes important when the amount and concentration of a vapor being delivered to an enclosed space determines the intended effectiveness of the vapor. Thus, if a vapor is used to sterilize an atmosphere and the vapor concentration is an important factor in achieving the desired sterilization, correct vaporizer design to give the desired vapor concentration is required. As an example, of such a requirement, it has been found that a composite vapor consisting of 3% triethylene glycol vapor and 97% water vapor is effective in achieving air sterilization and to prevent air-borne infection when supplied to a treated space in adequate quantity.

Assume that such a vapor proportion can be obtained by boiling a miscible binary mixture of 90% triethylene glycol and 10% water. An ordinary vaporizer would be ineffective to maintain the desired 3% triethylene glycol vapor-97% water vapor output because, as the binary liquid mixture of triethylene glycol and water is boiled, more water than triethylene glycol is vaporized with the result that the concentration of the liquid in the vaporizer would change and, hence, the vapor ratio output would also change. Also, because the miscible binary mixture would now contain a greater relative proportion of triethylene glycol to water than did the original mixture, the boiling point, and hence the temperature of the mixture, would increase. Continued increase in mixture temperature as the concentration of triethylene glycol increases, could result in overheating the mixture and the possible release of impurities through break down of the triethylene glycol. Such impurities could be detrimental to air sterilization and to individuals breathing such air. Thus, when the generated vapor is used for air sterilization and germicidal purposes it is important to prevent the introduction of impurities, which might raise the possibility of toxicity, into air being breathed by persons. If a source of such impurities could be overheating of the liquid in a vaporizer, brought about by an incorrect concentration of such liquid where the concentration is dependent upon the relative proportion of components forming the liquid, then a vaporizer is needed that will maintain liquid

2 concentration, and hence the vapor concentration, substantially constant.

Furthermore, when the enclosed space to which the vapor is being delivered is relatively small, such as a room, for example a vaporizer is required that will be relatively inexpensive, portable, and easy to maintain in operating condition. The output from such a vaporizer need only be great enough to sterilize adequately the air in the relatively small enclosed space. Preferably, the vaporizer should be self contained, that is free from external pipe connections for adding liquid so that it will be a compact unit capable of being placed in different positions within the enclosed space. Our invention provides such an apparatus and a method of using it to obtain a substantially constant predetermined vapor output.

While we have used triethylene glycol and water as an example of a miscible binary mixture which, when heated, will change in concentration, the problem of maintaining liquid concentration substantially constant exists whenever one heats a mixture of miscible liquids having different boiling points and it is desired to maintain a vapor output of substantially constant predetermined concentration. The liquid concentration required to maintain the correct output vapor ratio can be determined from the temperature composition diagram of the particular miscible mixture being used. A satisfactory vaporizer for such a mixture will include means to compensate for the greater loss of the more volatile liquid component or components if the original liquid concentration is to be maintained and, hence, the output vapor ratio of concentration is to remain substantially constant.

We have found that one means to compensate for the greater loss of the more volatile liquid component, or components, is to add, during heating of the mixture, additional liquid containing the same components as the liquid being heated but having these components substantially in the proportion which the constituents of the vapor output bear to each other. Not only does this compensate for the greater loss of the more volatile liquid component, or components, but it also replenishes the smaller loss of the less volatile liquid component, or components.

Accordingly, a primary object of the present invention is to provide a method and apparatus for introducing a vapor of substantially constant predetermined component proportion into an atmosphere and to maintain the output vapor proportion substantially constant during operation of the apparatus by adding additional liquid proportioned in accordance with the output vapor proportion.

Other objects of the present invention are to provide a method and apparatus for vaporizing liquid in which the concentration of the liquid being heated is maintained substantially constant without requiring the movement of any mechanical elements; to provide a method for vaporizing liquid which includes a simple method for replenishing the liquid being vaporized and still maintains the output vapor concentration substantially constant; to provide an apparatus for vaporizing liquid which is compact, portable, easy to maintain, and easy to operate.

These and other objects of our invention will become apparent from the following detailed description taken in conjunction with the accompanying drawings in which Fig. 1 is a front elevational view, mostly in cross section, of the vaporizing apparatus including a schematic wiring diagram showing the connection of the electrical elements;

Fig. 2 is a sectional view taken on line 2—2 of Fig. 1; and

Fig. 3 is a temperature composition diagram for a miscible binary mixture of triethylene glycol and water.

Referring to Fig. 1, the principal elements of the vaporizer are a tank 10 for containing the liquid 11 to be vaporized, a heating element 12 for heating said liquid, the receptacle 13 for containing a liquid 14 to be added to the liquid 11 as the latter is heated, and a feed cup 15 for controlling the admission of liquid 14.

The container for the liquid to be vaporized, tank 10, is preferably a cylindrical metal tank, the size being dependent upon the quantity of liquid to be vaporized. In a vaporizer for an ordinary size room, tank 10 need only be from twelve to eighteen inches in diameter. In the embodiment shown in Fig. 1, tank 10 is mounted on casters 16 of sufficient height to raise the bottom of the tank above the floor level to permit the heating element 12 to be positioned beneath the tank. The heating element can be either a flame source of heat or a radiant heater, such as an electric heating coil. It is attached to the underside of the tank 10 by a suitable means, not shown. A convective heater could be used if desired.

In our embodiment we use an electric radiant heating element which can be either 1000 watts or 2000 watts rating or other appropriate value, depending upon the power source available, the size of the tank being heated and the desired rate of vaporization. It is obvious, though not shown, that by means of either a voltage or resistance control, the heat output of a particular radiant heater could be controlled as desired to vary the rate of vaporization.

Adjacent the top of the tank 10 are a plurality of vapor outlets 17. The number of vapor outlets can be varied as desired, although there should be at least two, and preferably more. A reinforced insulation member 18 rests, as shown in Fig. 1, on the upper edge of tank 10. Member 18 serves both as a cover for tank 10 and also as a support for receptacle 13. The lower portion of member 18 is formed, as shown in Fig. 1, in a cup shape, as indicated at 15.

Member 18 is preferably made of a good insulation material, such as air-cell asbestos suitably reenforced to give the insulation sufficient strength to support the receptacle 13. The insulation is preferably one inch to one and one-half inches thick. The receptacle 13 is preferably a glass container of the familiar "water bottle" shape, shown in Fig. 1, and has a wide mouth 19, which extends into the receiving cup portion 15 of the insulation member 18 when the receptacle 13 rests upon shoulder portions 24 of member 18. Shoulder portions 24 support receptacle 13 in such a manner that air passage is permitted between the receptacle and the shoulder portion. This is accomplished by the rib structure indicated at 25 which permits air passage into and out of receiving cup 15.

When the receptacle 13 is filled with liquid and then quickly inverted and placed with its mouth down in receiving cup 15, the liquid 14, contained in receptacle 13, will fill the receiving cup 15 to a level determined by the level of the liquid 11 in tank 10. Necessarily, if continued drainage of liquid from receptacle 13 is to be prevented, the level of liquid 11 in tank 10 has to be slightly higher than the lower edge 20 of the receptacle mouth 19. Liquid is fed from receiving cup 15 into tank 10 through a tube member 21 in the bottom of receiving cup 15.

In Fig. 2 the tube member is shown as extending along the inner periphery of receiving cup 15 and adjacent the bottom thereof, and extending through the receiving cup at 22. A plurality of holes 23 in the top of member 21 permit liquid entry into the tube and, hence, into tank 10 through outlet 22. Tube member 21 need only be about one-quarter inch to one-half inch in diameter. The comparatively narrow diameter of the tube, and its length, prevent excessive intermingling of the liquid in the receptacle with that in the receiving cup. This also aids in preventing the relatively hot liquid in the receptacle from raising the temperature of the liquid in the receiving cup, and hence the liquid in the second receptacle 13 excessively. A collar member 26 surrounds receptacle 13 and rests upon the upper edge of insulation member 18. Collar member 26 is preferably made of a bright surfaced metal, such as aluminum.

Since we utilize an electric radiant heating element, we show in Fig. 1 lead-in wires 27 from an electrical power source, either 110 or 220 volts, depending upon the size and rating of the particular heater being used. Switch 28 provides manual on or off connection of the heater element to the power source. A suitable cut-out, such as an electromagnetic cut-out 29, is also provided. Cut-out 29 is controlled and connected by leads 30 to an adjustable thermostat 31 which is mounted, as shown, on the outer vertical side of tank 10. Thermostat 31 is a safety device to prevent overheating of the tank and the liquid contained therein, which could occur if the liquid level dropped too far. The thermostat is set at a predetermined maximum high temperature value, and when this temperature value is reached, the thermostat energizes cut-out 29 which, in turn, opens the circuit connecting the heater element 12 to the power source. If desired, cut-out 29 can be provided with a manual reset.

In Fig. 1 we show, beneath the vapor outlet 17, baffle members 32 which prevent liquid from splashing out of the tank through outlet 17. The baffles contain openings 33 adjacent the side of the tank to permit liquid which may be collected by the baffles to drain back into the tank. Baffles 32 can extend completely around the inner periphery of the tank or, as is preferable, they can be disposed only adjacent outlet 17. When the liquid mixture contained in tank 10 is corrosive in nature, or produces corrosive vapors, it is necessary to line metal surfaces which are exposed to the vapors, such as the interior of the tank and the baffle members 32, with a suitable corrosion resistant material. Thus, we show at 34 an inner lining of copper plating to prevent corrosion where a miscible binary mixture of triethylene glycol and water is the solution to be vaporized in our apparatus.

We achieve a substantially constant proportion of constituent vapors, from a mixture of miscible liquids having different boiling points, as follows:

The liquid concentration of a miscible mixture necessary to obtain a substantially constant predetermined proportion between the constituent vapors generated upon heating said mixture can be determined from the temperature composition diagram of the particular mixture chosen. Thus, we show in Fig. 3, as an example, the temperature composition diagram of a miscible binary mixture of triethylene glycol and water.

Assume that we desire a vapor proportion of 3% triethylene glycol to 97% water vapor. This proportion is indicated at point A on the diagram shown in Fig. 3. A vertical line from point A intersects the vapor composition curve at point B. The horizontal line drawn from point B intersects the liquid composition curve at point C. A vertical line dropped from point C intersects the horizontal axis at point D. The reading at point D shows 90% triethylene glycol and 10% water as the composition of the liquid to be added to tank 10. Fig. 3 further shows that this liquid boils at 260° F. to produce vapors having a proportion of 3% triethylene glycol vapor and 97% water vapor.

The tank 10 is filled with a mixture of miscible liquids having different boiling points which, as we have indicated as an example, can be a miscible binary mixture of triethylene glycol and water, to a level slightly above the lower edge of the mouth of receptacle 13 when the latter is positioned as shown in Fig. 1. The filling of tank 10 can be easily accomplished, prior to the placement of receptacle 13, by simply removing insulation member 18 and filling the tank from the top. After the tank is filled, member 18 is replaced and receptacle 13, which is filled with the liquid to be added to the liquid in the tank, can be quickly inverted and placed with its mouth down and within the receiving cup 15. When this is done liquid will drain from receptacle 13 until the level of the liquid in the receiving cup cuts off further drainage. Thereafter, the level of the liquid within the receiving cup is controlled by the level of the liquid in tank 10. Thus, there is, in effect, a gravity liquid feed from the receiving cup to the interior of tank 10.

When heater element 12 is energized, the liquid 11 is heated to boiling point. This causes vaporization of the liquid 11 and a consequent lowering of the level of this liquid within the tank 10. When this occurs, the level of the liquid in the tank and the level of the liquid in the receiving cup differ with the result that liquid flows through tube 21 from the receiving cup into the tank thus lowering the liquid level in the receiving cup below the edge 20 of the mouth of receptacle 13. An air bubble then enters receptacle 13 and forces liquid out of the receptacle and into the receiving cup 15. This again causes a different liquid level in the receiving cup and in the tank 10 with the result that liquid flows from the receiving cup into the tank to reestablish the original liquid level.

We have found that we can not only prevent lowering of the liquid level of the liquid in tank 10, but that we can maintain the original concentration of that liquid, and hence maintain the vapor output concentration substantially constant, by placing a liquid in receptacle 13 having the components thereof the same as the components of the liquid in tank 10 but in substantially the same proportion as the proportion of the constituents in the vapor output. Thus, if we assume a vapor output containing 3% triethylene glycol vapor and 97% water vapor which, as we have indicated heretofore, can be produced by boiling a miscible binary mixture consisting of 90% triethylene glycol and 10% water, we have found that we can maintain the liquid proportion substantially constant, and hence the vapor proportion substantially constant by adding, as the liquid is heated, additional liquid consisting of 5% triethylene glycol and 95% water.

It will be noted that the 5% and 95% proportion is slightly different from the 3% and 97% proportion. This slightly higher glycol content in the liquid being added is required because replenishment cannot take place instantaneously and it is necessary to compensate for the loss of liquid volume in tank 10 caused by a slight time lag in the operation of the automatic feed through the receiving cup 15. The nearer the level of the liquid is to the edge 20 of the mouth of the receptacle 13, the less this time lag will be. However, the 5% glycol value is substantially the same as the 3% glycol value in the vapor output and the glycol water proportion in the liquid being added and in the vapor output can be considered to be substantially the same. When the dilute glycol mixture is added, not only does it maintain the liquid level of the liquid 11 in tank 10 substantially constant and also its glycol concentration, but it also maintains the temperature of liquid 11 substantially constant. Substantially constant temperature results from substantially constant glycol concentration as can be seen from the temperature composition diagram shown in Fig. 3. A 90% triethylene glycol-10% water mixture, boils at substantially 260° F. while higher glycol concentrations have higher boiling points and lower glycol concentrations have lower boiling points.

During operation of the vaporizer, the liquid 14 in receptacle 13 and the liquid in the receiving cup 15 is prevented from becoming overheated by the insulating member 18, which not only supports receptacle 13 but also forms the receiving cup 15. Heat transfer through the insulation wall forming receiving cup 15 is very slow and, when the vaporizer is operating and liquid is moving from the receiving cup into the tank 10, the moving liquid tends to carry away any heat that might come through the insulation. In addition, the body of the receptacle 13 is protected by the insulating member 18, as shown in Fig. 1. The vapors generated during operation of the vaporizer do not come into contact with the receptacle 13.

It will be seen that we have provided a method and apparatus for vaporizing liquid and for introducing a vapor into an atmosphere where the vapor is of substantially constant component proportion and where this component proportion is maintained by controlling the concentration of the liquid which is heated to produce the vapor. Furthermore, we achieve liquid concentration control by a novel method and provide an apparatus which is simple to operate, easy to maintain, compact and portable.

In the embodiment of our invention which we have illustrated in the attached drawings, it can be noted that the receptacle 13 is positioned within the tank 10. It will be obvious that tank 10 could be provided with a separate cover and that the receptacle 13 could be mounted away from tank 10 and arranged with a receiving cup so that liquid could be fed to tank 10 in the same manner which we have illustrated. Thus, while we have described a particular embodiment of our invention, it is to be understood that we do not wish to be restricted to this and that we intend to cover all modifications thereof, such as mounting the liquid receptacle outside of the tank 10, which would be apparent to one skilled in the art and which comes within the spirit and scope of the invention.

We claim:

1. In apparatus for generating and delivering to the atmosphere a predetermined proportion of glycol and water vapor, the combination of a container open to the atmosphere and adapted to contain a mixture of glycol and water in specified proportions, means for heating the liquid mixture in the container to cause vaporization thereof, said container having a wide-mouthed opening at the top, and means for replenishing liquid dissipated by said vaporization to substantially maintain the liquid within the container at a given height above the bottom thereof, said replenishing means including a cup-shaped member having a flange portion resting on the rim of said wide-mouthed opening and a liquid-receiving portion extending into said container to a point below said given height, and a liquid receptacle open at one end and closed at the other and adapted to contain a replenishing liquid, said receptacle being supported in inverted position on said cup-shaped member with said open end at said given height, the liquid-receiving space within said cup-shaped member being in open communication with the atmosphere above said given height and in open communication with the container below said given height, whereby as liquid is vaporized from said container the liquid in the container is maintained substantially at said given height by gravity feed of replenishing liquid from said receptacle.

2. Apparatus as set forth in claim 1 in which the replenishing fluid in said receptacle consists of a mixture of glycol and water in substantially the same proportion as the vapor issuing from the container whereby the constituency of the liquid mixture in the container remains substantially constant as long as there is replenishing fluid in said receptacle.

3. Apparatus as set forth in claim 1 in which the communication between the container and the liquid-receiving space in the cup-shaped member is through a restricted tube of substantial length to prevent excessive co-mingling of the liquids within and outside of said cup-shaped member.

4. Apparatus as set forth in claim 1 in which the cup-shaped member is made of a heat insulating material.

BURGESS H. JENNINGS.
EDWARD BIGG.
FRANKLYN C. W. OLSON.

REFERENCES CITED

The following references are of record in the file of this patent:

UNITED STATES PATENTS

| Number | Name | Date |
|---|---|---|
| 2,369,900 | Jennings et al. | Feb. 20, 1945 |
| 2,379,034 | Pargman | June 26, 1945 |